Sept. 23, 1969    R. D. CUMMINS    3,468,307
INTERMITTENT POSITIVE PRESSURE BREATHING APPARATUS
Filed Oct. 26, 1966    4 Sheets-Sheet 1
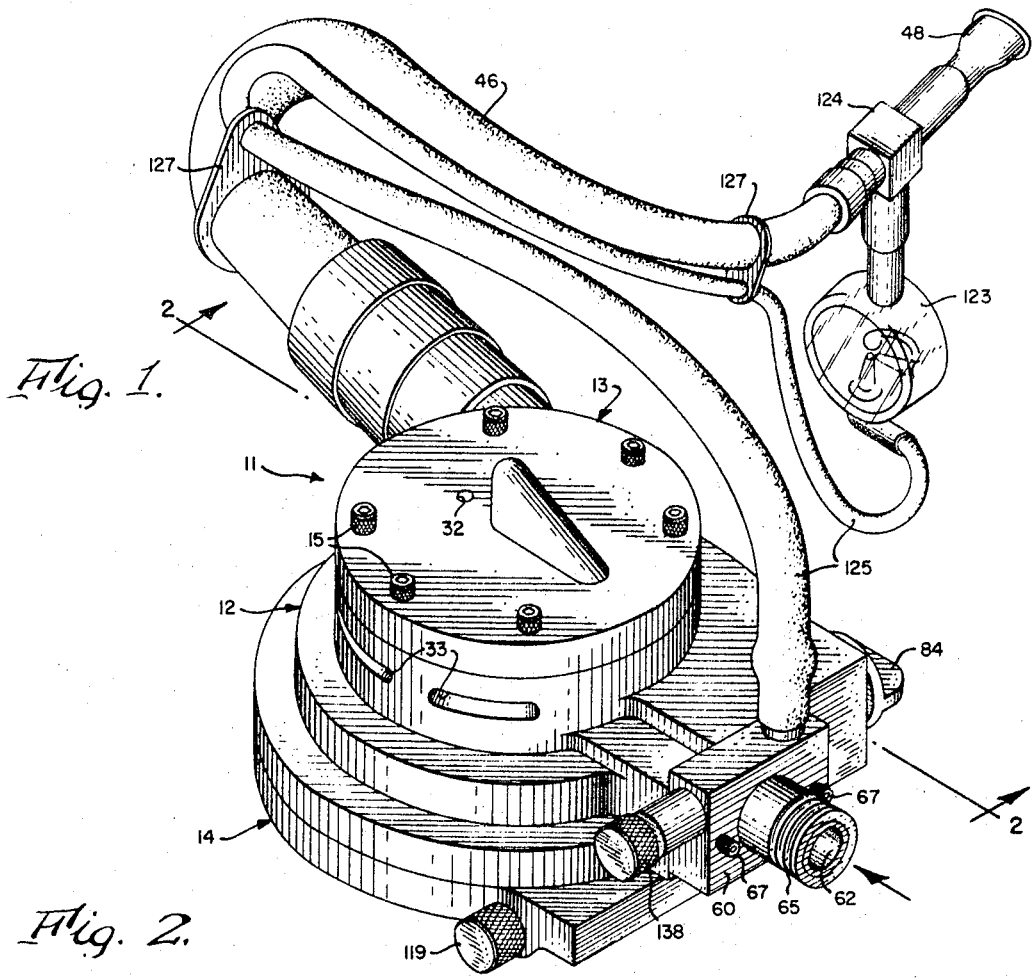
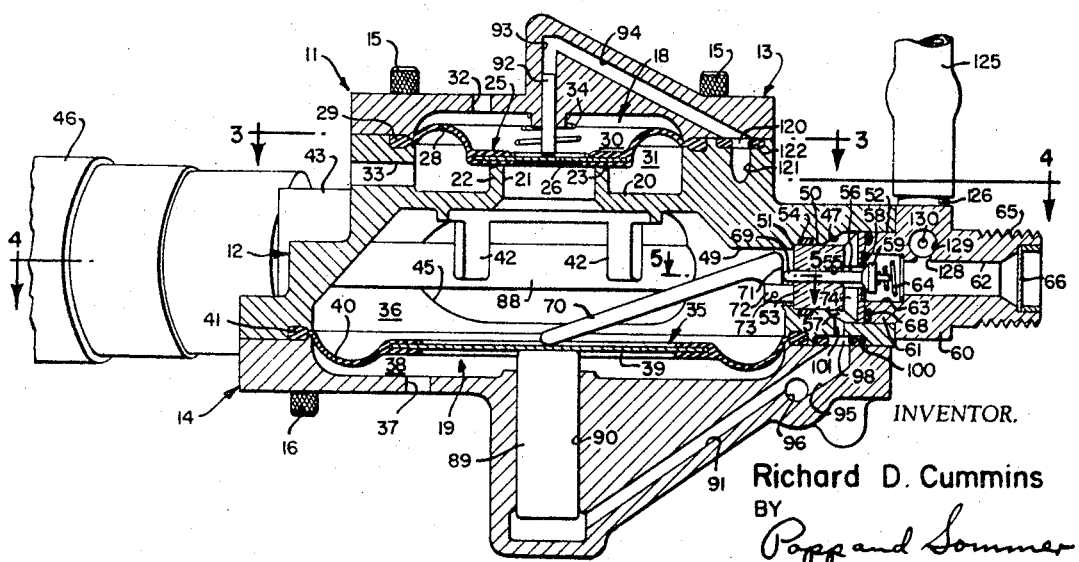
INVENTOR.
Richard D. Cummins
BY
Popp and Sommer
ATTORNEYS Sept. 23, 1969  R. D. CUMMINS  3,468,307
INTERMITTENT POSITIVE PRESSURE BREATHING APPARATUS
Filed Oct. 26, 1966  4 Sheets-Sheet 2
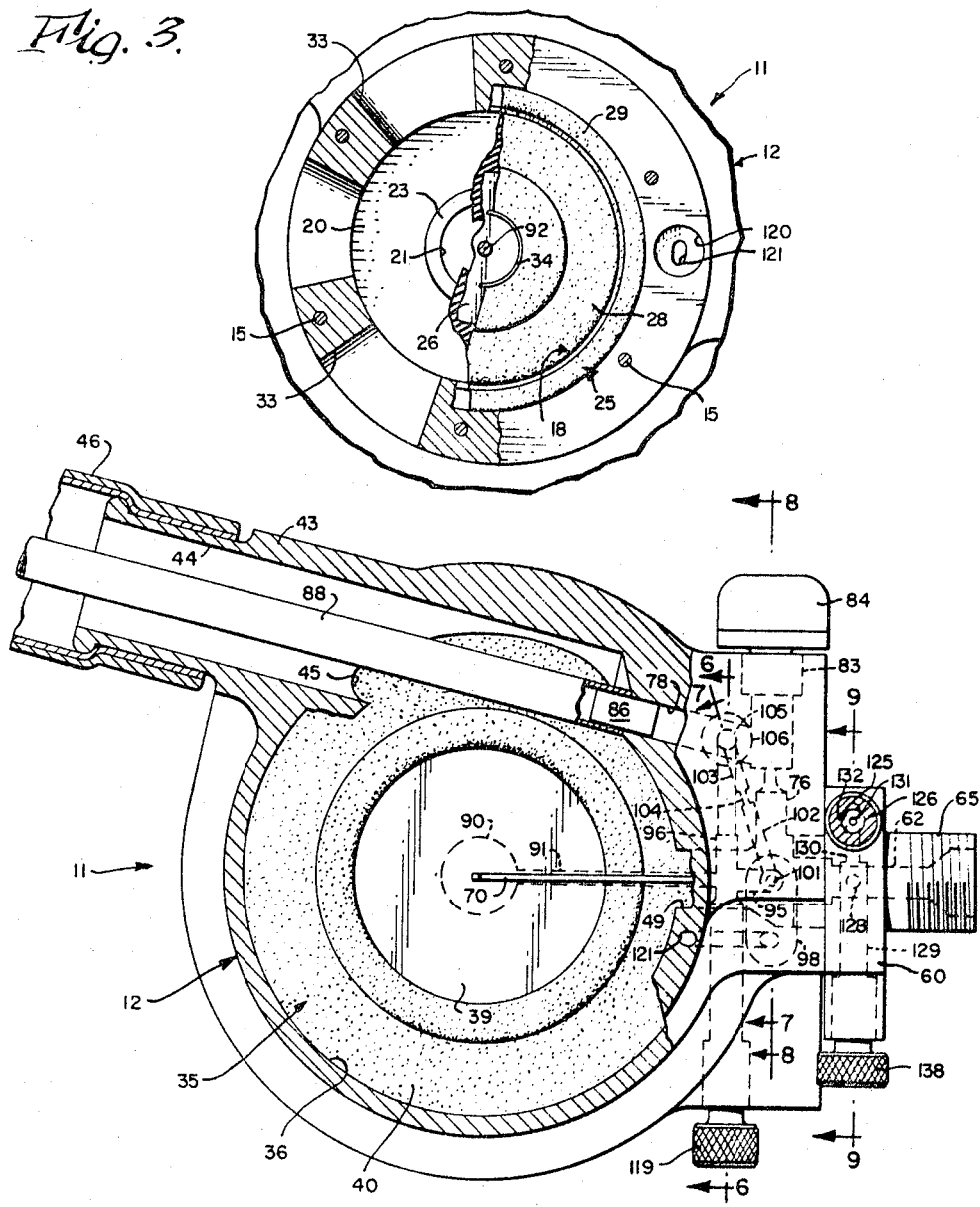
Fig. 3.
Fig. 4.
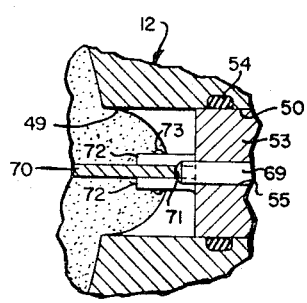
Fig. 5.
INVENTOR.
Richard D. Cummins
BY
Popp and Sommer
ATTORNEYS Sept. 23, 1969  R. D. CUMMINS  3,468,307
INTERMITTENT POSITIVE PRESSURE BREATHING APPARATUS
Filed Oct. 26, 1966  4 Sheets-Sheet 3

INVENTOR.
Richard D. Cummins
BY
Popp and Sommer
ATTORNEYS

3,468,307
INTERMITTENT POSITIVE PRESSURE
BREATHING APPARATUS
Richard D. Cummins, Hamburg, N.Y., assignor to Carleton Controls Corporation, East Aurora, N.Y., a corporation of New York
Filed Oct. 26, 1966, Ser. No. 589,688
Int. Cl. A62b 7/00
U.S. Cl. 128—145.5          5 Claims

ABSTRACT OF THE DISCLOSURE

An intermittent positive pressure breathing apparatus including a chamber having an inlet and an outlet, this chamber in part being defined by an inhalation diaphragm and an exhalation diaphragm normally closing the chamber outlet, movement of the inhalation diaphragm being initiated by inhalation on the chamber inlet to cause a supply valve for pressurized gas to open, gas passed by said valve being utilized to produce a self-energizing action in opening said valve fully and holding said exhalation diaphragm in its position closing said outlet, the gas flowing at a predetermined rate for inhalation until a predetermined peak pressure is reached in said chamber causing retrograde movement of said inhalation diaphragm thereby initiating a self-denergizing action for the diaphragms and consequent quick opening of said chamber outlet to permit exhalation. The apparatus also has adjustable control valves for selectively varying the inhalation gas flow rate and peak pressure.

---

This invention relates to improvements in intermittent positive pressure breathing apparatus.

An object of the present invention is to provide intermittent positive pressure breathing apparatus which is so constructed as to enable the breathing flow rate to be selectively varied widely, and independently of the delivered pressure.

Another object is to provide such apparatus which is constructed as to enable the peak pressure to which the lungs of the user are inflated when using the apparatus to be selectively varied widely and independently of the breathing flow rate.

Another object is to provide such apparatus which is so constructed as to have a self-energizing action in starting the flow of pressurized gas and a self-deenergizing action in terminating such flow.

Another object is to provide such apparatus which is composed of a relatively small number of components and is easy to disassemble for autoclaving in order to render the apparatus sterile.

Another object is to provide such apparatus which is simpler and less expensive than devices for the same purpose as heretofore constructed.

Still other objects and advantages of the present invention will be apparent from the following detailed description of a preferred embodiment shown in the accompanying drawings in which:

FIG. 1 is a perspective view of intermittent positive pressure breathing apparatus embodying a preferred form of the present invention.

FIG. 2 is a fragmentary enlarged vertical central sectional view thereof taken on line 2—2 of FIG. 1.

FIG. 3 is a fragmentary horizontal sectional view thereof taken on line 3—3 of FIG. 2.

FIG. 4 is another fragmentary horizontal sectional view thereof taken generally on line 4—4 of FIG. 2.

FIG. 5 is still another fragmentary horizontal sectional view thereof taken on line 5—5 of FIG. 2.

Figure 6:
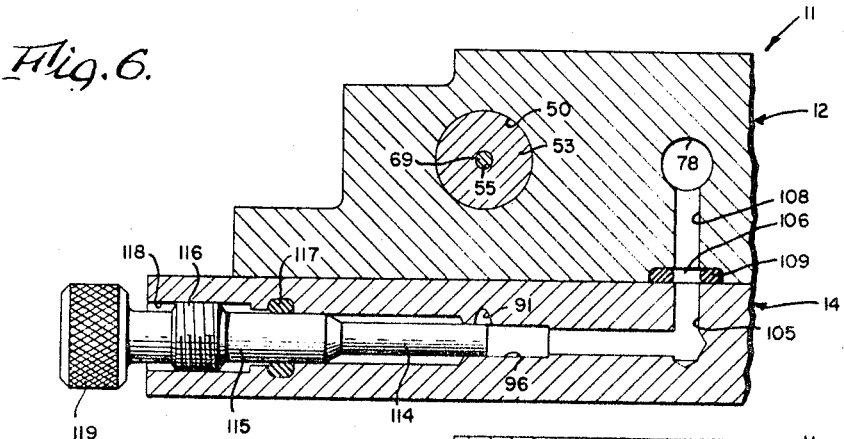
FIG. 6 is a fragmentary enlarged vertical transverse sectional view thereof taken on line 6—6 of FIG. 4.

The intermittent positive pressure breathing apparatus embodying the present invention is shown as including a body represented generally by the numeral 11 which includes an intermediate body member 12, a top cover body member 13 and lower cover body member 14. Top member 13 is shown as removably secured to intermediate member 12 by an annular series of screws 15. Similar screws 16 removably secure lower member 14 to intermediate member 12.

Interiorly body 11 is formed to provide an upper main compartment 18 and a lower main compartment 19 separated by a horizontal wall 20 having an outlet opening 21 therein which establishes communication between main compartments 18 and 19. This wall 20 is shown as having an upstanding tubular flange portion 22 which surrounds outlet opening 21 and the upper end face 23 of this flange portion provides an annular seat.

Arranged in upper main compartment 18 is an exhalation pressure diaphragm represented generally by the numeral 25 which is shown as including a relatively rigid but still thin imperforate central disk 26 to the margin of which is suitably attached the inner marginal portion of an upwardly bowed ring 28 of imperforate flexible material. The outer marginal portion of this ring 28 is shown at 29 as being enlarged and sealingly clamped between body members 12 and 13. Thus, diaphragm 25 divides upper main compartment 18 into an upper ambient pressure reference chamber 30 and a lower exhaust chamber 31. Upper chamber 30 is shown as communicating with the atmosphere external to body 11 through a vertical passage 32 provided in the top of upper body member 13. Exhaust chamber 31 is shown as communicating with the atmosphere external to body 11 through a plurality of horizontal passages individually represented by the numeral 33 which passages extend through the side wall of the upper portion of intermediate body member 12 and are arranged at circumferential intervals in this upper side wall portion.

Exhalation diaphragm 25 is arranged above upwardly facing annular seat 23 surrounding the downstream end of outlet opening 21 and this diaphragm is adapted to engage this seat sealingly and is shown as urged thereagainst by a helical compression spring 34 arranged above this diaphragm intermediate it and the top wall of upper chamber 30.

An inhalation triggering diaphragm represented generally by the numeral 35 is shown arranged in lower main compartment 19 and divides the same into an upper exhalation chamber 36 with which outlet opening 21 communicates and a lower ambient pressure reference chamber 38. This chamber 38 is shown as communicating with the atmosphere external to body 11 through a vertical passage 37 provided in the bottom of lower body member 14. Diaphragm 35 is shown as including a relatively rigid but still thin walled imperforate central disk 39 the marginal portion of which is shown as suitably connected to the inner marginal portion of a downwardly bowed imperforate flexible ring 40. The outer marginal portion of this ring 40 is shown at 41 as being enlarged and sealingly clamped between the opposing surfaces of body members 12 and 14.

Diaphragm 35 is capable of moving upwardly from the position shown in FIG. 2 during which upward movement the volume of exhalation chamber 36 is reduced. The maximum upward movement of the diaphragm 35 is limited by engagement with the lower ends of a plurality of circumferentially spaced stops 42 depending integrally from body wall 20.

Intermediate body member 12, as best shown in FIG. 4, has a horizontally outwardly extending nipple 43 housing an inlet passage 44 which communicates with an inlet opening 45 to exhalation chamber 36. Suitably attached to the outer end of nipple 43 is one end of a flexible exhalation gas exhaust hose 46 and the other end thereof is suitably connected to a mouthpiece 48.

Intermediate body member 12 is also shown as having a horizontal bore 49 extending through the side wall thereof and which includes an intermediate counterbored portion 50 and an outer counterbored portion 52. The step between bore 49 and counterbore 50 provides a vertical outwardly facing annular shoulder 51. Counterbore 50 changes to counterbore 52 by a tapered transition 47.

Shown arranged in counterbore 50 and partially in outer counterbore 52 is an inlet valve seat and guide member 53. The inner end of this member 53 abuts shoulder 51 and an annular seal ring such as a rubber O-ring 54 carried by body member 12 sealingly engages the periphery of member 53. This member is shown as having a horizontal bore 55 extending therethrough the outer end portion of which is counterbored as indicated at 56. At the outer end of this counterbore 56, member 53 is formed to provide an annular seat 58 for an inlet valve 59. There is some clearance between transition wall 47 and the intermediate peripheral portion of member 53 to provide an annular space 57.

Valve seat and guide member 53 is shown as held against shoulder 51 by a fitting 60 having a reduced cylindrical portion 61 entering counterbore 52. The inner end of this reduced portion 61 engages the outer end face of member 53. A pair of screws 67 secure fitting 60 to intermediate body member 12 as shown in FIG. 1. Extending horizontally through fitting 60 is a gas supply passage 62 the inner end portion of which is an enlarged counterbore as indicated at 63 and communicates with counterbore 56 in member 53 when inlet valve 59 is unseated. A helical compression spring 64 is shown arranged in counterbore 63 and operatively interposed between the stepped shoulder of this and valve 59 so as constantly to urge such valve to a closed position engaging seat 58. An annular seal member such as a rubber O-ring 68 is shown as interposed between the opposing end faces of member 53 and fitting 60 and surrounds counterbore 63 to prevent leakage radially outwardly along the joint between these opposing end faces. The outer end of fitting 60 is shown as being externally threaded as indicated at 65 to adapt this fitting for connection to a conduit (not shown) for supplying pressurized gas to be breathed to passage 62. A gas filter 66 is shown as extending across passage 62 adjacent the outer end thereof.

Valve 59 is shown as having a stem 69 slidably arranged in bore 55 in member 53 and has its inner end projecting into exhalation chamber 36.

Means are provided for unseating valve 59 in response to upward movement of inhalation diaphragm 35. Such means are shown as including a lever 70 one end of which bears against the upper surface of diaphragm 35 at the center thereof and the other end portion of which extends laterally to provide an abutment surface 71 and the outer extremity of this lateral end portion is suitably hinged for pivotal movement about a horizontal axis. For this latter purpose, as best shown in FIG. 5, valve seat and guide member 53 has a pair of laterally spaced inwardly projecting arms 72 between which the extremity of lever 70 is arranged. These arms and the lever are provided with aligned horizontal holes in which a hinge pin 73 is arranged.

Figure 8:
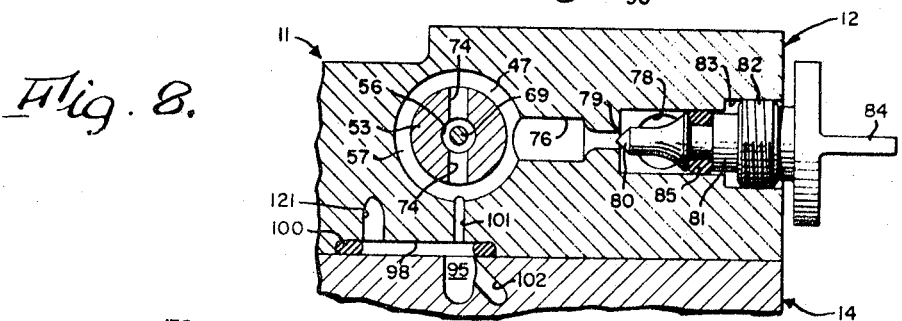
FIG. 8 is another fragmentary enlarged vertical transverse sectional view thereof taken on line 8—8 of FIG. 4.
Figure 9:
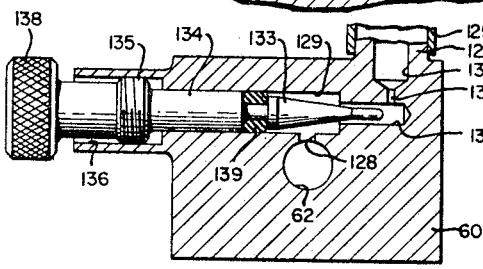
FIG. 9 is still another fragmentary enlarged vertical sectional view thereof taken on line 9—9 of FIG. 4.
Figure 10:
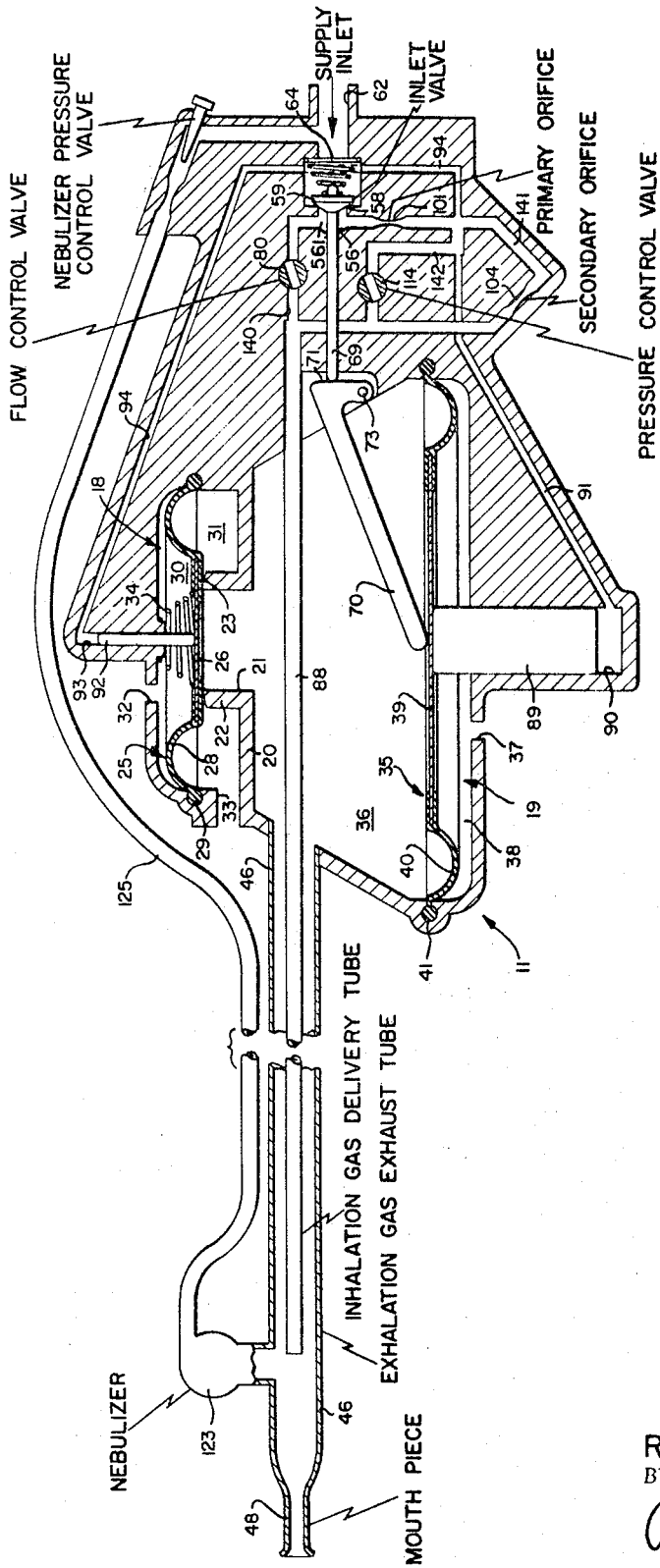
FIG. 10 is a schematic view of the apparatus shown in FIG. 1 and is generally a vertical longitudinal central sectional view thereof.

Inhalation gas delivery conduit means are provided which at one end communicate with the gas supply conduit means on the downstream side of inlet valve 59. While such means may be variously constructed, the same, as shown in FIGS. 2, 4 and 8, include a pair of radial passages 74 provided in member 53 at their inner ends communicating with counterbore 56 and at their outer ends communicating with annular space 57. Communicating with this annular space 57 is one end of a horizontal passage 76 the other end of which communicates with one end of an intercepting horizontal passage 78. Intermediate its ends passage 76 is formed to provide an annular seat 79 which is opposed by a flow control valve 80. This valve 80 is carried on the inner end of a stem 81 having an enlarged portion 82 externally threaded and screwed into an internally threaded recess 83 provided in body member 12 as an extension of passage 76. The outer end of this valve stem 81 has a manipulatable knob 84 fast thereto. Intermediate threaded portion 82 and valve 80, stem 81 carries an annular seal ring such as a rubber O-ring 85 which sealingly engages the extension of bore 76.

The end of passage 78 remote from flow control valve 80 is shown in FIG. 4 leading to the end of passage 44 and having press-fitted therein a nipple 86. To the portion of this nipple which projects into inlet passage 44 is connected one end of a flexible gas delivery tube 88. This tube is shown as extending through inlet passage 44, through hose 46 and at its other end terminating adjacent but inwardly of mouthpiece 48.

Self-energizing means are provided for opening inlet valve 59 and such means are arranged to be activated by inhalation on chamber 36. As shown, such means include an inhalation triggering piston 89 slidably arranged for vertical movement in a cylindrical bore 90 provided in lower body member 14. The upper end of piston 89 is shown as engaging the center portion of the bottom surface of diaphragm 35. Communicating with the lower end of cylinder 90 is one end of service passage 91.

An exhalation pressure control piston 92 is shown as slidably arranged for vertical movement in a cylindrical bore 93 arranged in upper body member 13. The lower end of this piston 92 engages the central portion of the upper surface of diaphragm 25. The upper end of cylindrical bore 93 is shown as communicating with one end of a service passage 94.

Means are provided for supplying gas having a selectively variable pressure to service passages 91 and 94 and thereby vary the loading on pistons 89 and 92. Such means will now be described.

Referring to FIG. 2, lower body member 14 is shown as having an enlarged recess 95 opening to the upper face of this member and at its lower end communicating with an intersecting horizontal passage 96. The upper end of recess 95 communicates with an oblong-shaped recess 98 provided in the lower surface of intermediate body member 12. A seal ring such as a rubber O-ring 100 is operatively interposed between body members 12 and 14 to seal leakage from this recess 98 outwardly between the opposing surfaces of these body members. A vertical restricted passage 101 is shown as provided in intermediate body member 12 having its upper end communicating with annular space 57 and its lower end communicating with recess 98.

Figure 7:
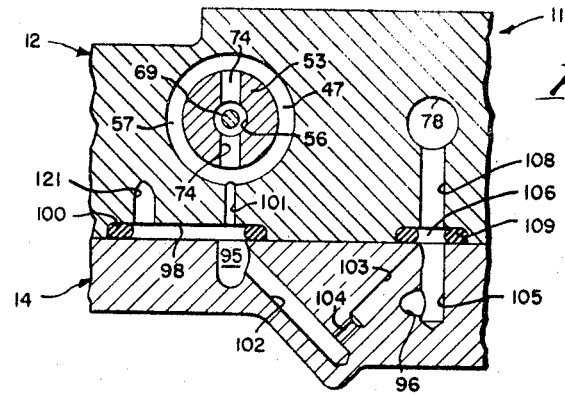
FIG. 7 is a fragmentary enlarged vertical transverse sectional view thereof taken on line 7—7 of FIG. 4.

Referring to FIG. 7, recess 95 is shown as communicating with the upper end of a downwardly inclined recess 102 provided in lower body member 14. The lower end of this recess 102 is adjacent the lower end of an upwardly inclined passage 103 provided in lower body member 14. The adjacent ends of recess 102 and passage 103 are shown as connected by a restricted passage 104 also provided in lower body member 14. The upper end of this inclined passage 103 is shown as communicating with a vertical recess 105 provided in the upper face of lower body member 14. The upper end of this recess 105 is shown as communicating with the lower enlarged end portion 106 of a vertical passage 108 provided in intermediate body member 12. The upper end of this passage 108 communicates with passage 78. An annular seal ring such as a rubber O-ring 109 is arranged in enlarged portion 106 to prevent leakage radially outwardly from recess 105 along the interface between body members 12 and 14.

Referring to FIG. 6, horizontal passage 96 also leads to and communicates with the lower end of vertical recess 105 provided in the upper surface of lower body member 14.

A pressure control valve 114 has its inner end slidably arranged in passage 96 so as to control the extent of communication between this passage 96 and recess 95. Referring to FIG. 6 valve 114 is arranged on the inner end of a valve stem 115 having an enlarged intermediate externally threaded portion 116 which screws into the outer enlarged internally threaded portion 118 of an extension of passage 96. The outer end of stem 115 has fast thereto a manipulatable knob 119 for turning valve stem 115 and adjusting the axial position of pressure control valve 114. An annular seal ring such as a rubber O-ring 117 is shown as surrounding valve stem 115 intermediate valve 114 and threaded portion 116 and is operatively interposed between this valve stem and lower body member 14 so as to prevent leakage outwardly along this valve stem.

The end of lower piston service passage 91 remote from piston cylinder 90 communicates with recess 95 at a location intermediate flow restrictors 101 and 104.

The end of upper piston service passage 94 remote from piston 92 is shown in FIG. 2 as terminating in the lower surface of upper body member 13 and communicating with the enlarged upper end portion 120 of an angled passage 121 provided in intermediate body member 12. An annular seal ring such as a rubber O-ring 122 is arranged in enlarged passage portion 120 and is operative to seal against leakage radially outwardly of passage 94 along the interface between body members 12 and 13. The lower end of passage 121 is shown in FIGS. 7 and 8 as communicating with recess 98 which is also arranged between flow restrictors 101 and 104.

Means are provided for introducing a medicament in atomized form into the hose 46 adjacent mouthpiece 48. For this purpose, a nebulizer 123 of any suitable construction and adapted to contain a quantity of liquid medicament is shown in FIG. 1 as suitably connected to a fitting 124 interposed between mouthpiece 48 and the adjacent end of hose 46. Gas under a selectively variable pressure is supplied to nebulizer 123 for atomizing the liquid medicament. For this purpose, one end of a flexible feed tube 125 is suitably connected to nebulizer 123 and the other end thereof is connected to an upstanding nipple 126 formed on fitting 60. Tube 125 is shown in FIG. 1 as attached to hose 46 at longitudinal intervals by tie rings 127.

Referring to FIG. 9, supply passage 62 in fitting 60 communicates via a vertical branch passage 128 with the enlarged intermediate portion 129 of horizontal passage 130 extending transversely of passage 62, all provided in this fitting. The inner end of this transverse passage 130 is shown as communicating via a vertical restricted passage 131 with the lower end of a larger vertical passage 132 which extends upwardly through nipple 126 and communicates with the interior of nebulizer feed tube 125. A needle valve 133 is arranged for axial movement in passage 129, 130 to control the pressure of fluid passing therethrough. This needle valve 133 may be constructed in any suitable manner. As shown, it includes a stem 134 having an enlarged externally threaded portion 135 which screws into an internally threaded enlarged outer end passage portion 136. A manipulatable knob 138 is shown as fast to the outer end of valve stem 134. This stem between the tapered portion 133 and the cylindrical portion 134 is shown as carrying an annular seal such as a rubber O-ring 139 which sealingly engages the wall surface of passage portion 129. Referring to FIG. 2, it will be seen that branch passage 128 servicing the nebulizer communicates with gas supply passage 62 in fitting 60 upstream of inlet valve 59.

As a prelude to a description of the operation of the inventive device, it is deemed desirable to refer to the schematic illustration thereof depicted in FIG. 10 which will render the operation easier to understand. Body 11 is depicted as a unitary member, thus eliminating the three body members 12, 13 and 14. Also, the various flow passages are greatly simplified as illustrated in FIG. 10 and since this is an important aspect of the inventive concept, the simplified representation of the gas circuitry will be described. Otherwise, the same reference numerals used previously for various elements have been applied in FIG. 10 to the corresponding elements as much as possible.

Referring to FIG. 10, delivery tube 88 at its upstream end is shown as communicatively connected to the downstream end of a branch supply conduit 140 in which flow control valve 80 is arranged. The other end of this branch conduit 140 is shown as communicatively connected to a chamber 561 arranged downstream of valve 59. This chamber 561 is counterbore 56 of member 53. Conduit 140 (FIG. 10) corresponds to connected passages 74, 57, 76, and 78 (FIG. 8).

Another branch supply conduit 141 is shown in FIG. 10 as communicatively connected at one end of chamber 561 and the other end is communicatively connected to conduit 140 on the downstream side of flow control valve 80. This second branch supply conduit 141 has arranged therein the upstream flow restrictor 101 and the downstream flow restrictor 104. Conduit 141 (FIG. 10) corresponds to connected passages 74, 57, 101, 98, 95, 102, 104, 103, 105, 106 and 108 (FIG. 7).

A pressure control conduit 142 is shown in FIG. 10 as communicatively connected at one end to conduit 141 between restrictors 101 and 104 and has pressure control valve 114 arranged therein. The other end of this conduit 142 is shown as communicatively connected to conduit 141 on the downstream side of restrictor 104 and therefore communicates with conduit 140 on the downstream side of flow control valve 80. Conduit 142 corresponds to connected passages 95, 96, 105, 106 and 108.

Upper piston service passage 94 is shown in FIG. 10 as communicatively connected to conduit 141 between restrictors 101 and 104. In FIG. 10, passage 94 includes connected passages 120, 121 and 98 previously illustrated.

Lower piston service passage 91 is shown in FIG. 10 as communicatively connected to pressure control conduit 142 upstream of pressure control valve 114 and therefore communicates with conduit 141 intermediate restrictors 101 and 104. In FIG. 10, passage 91 includes connected passage 95 previously illustrated.

OPERATION

At the beginning of use of the various elements are in their respective conditions depicted in FIGS. 2 and 10. The user places mouthpiece 48 in his mouth and with his fingers pinches his nostrils or otherwise closes them. He then starts to inhale. This lowers the pressure in chamber 36 and produces a pressure differential across inhalation triggering diaphragm 35 with the predominant pressure being below this diaphragm, causing the same to begin to move upwardly thereby reducing the volume of exhalation chamber 36. Such upward movement of diaphragm 35 pivots lever 70 to push valve stem 69 and unseat inlet valve 59. As soon as this valve is unseated, pressurized fluid from a source (not shown) connected to inlet passage 62 and having a pressure typically 50 pounds per square inch gauge, flows into downstream chamber 561 (FIG. 10) and thereby into branch conduits 140 and 141. The fluid flowing through branch conduit 141 experiences a pressure drop in flowing through restrictor 101 and the pressure of gas in the portion of this conduit 141 intermediate restrictors 101 and 104 is applied via service conduits 91 and 94 to pistons 89 and 92. This drives these pistons toward each other. In the case of lower piston 89, it moves upwardly to pivot lever 70 further in a clockwise direction about the axis of hinge pin 73 and thereby opens inlet valve 59 still further. In the case of upper piston 92, it urges diaphragm 25 firmly against seat 23 thereby assuring a sealed closing of outlet opening 21 of chamber 36. This may be regarded as a self-energizing action initiated by inhalation on chamber 36.

Pressurized gas, flowing at a rate controlled by the setting of flow control valve 80 which also produces some pressure drop, flows through tube 88 toward mouthpiece 48, through the same and into the lungs of the user. The lungs may be regarded as a variable volume chamber which is inflated by the pressure of the entering gas until the pressure in the lungs rises to create a back pressure transmitted through the connected interiors of mouthpiece 48 and hose 46 to exhalation chamber 36. As the back pressure builds up, it reaches a level above atmospheric pressure where its effect on the upper surface of diaphragm 35 overcomes the upwardly directed force exerted by the atmosphere in ambient chamber 38 and piston 89, thereby causing the diaphragm to descend. Such action allows lever 70 to follow diaphragm 35 and valve stem 69 follows this lever and hence inlet valve 59 moves closer toward its seat 58. The effect of this is to reduce the supply of pressurized fluid to branch conduit 141 and the pressure in this conduit between flow restrictors 101 and 104 therein decreases in value and this decreasing pressure is transmitted via service passages 91 and 94 to piston cylinders 90 and 93, respectively. This reduces the upwardly directed loading on piston 89 and the downwardly directed loading on piston 92. The effect is to cause lower diaphragm 35 to move downwardly very quickly causing inlet valve 59 to close quickly by engaging its seat 58 thereby collapsing the pneumatic supports for pistons 89 and 92. This may be regarded as a self-de-energizing action initiated by downward movement of triggering diaphragm 35.

With the pneumatic support for upper piston 92 dissipated and the pressure in chamber 36 still being above atmospheric pressure, this chamber pressure is effective to lift upper diaphragm 25 off its seat 23 and allow this chamber to be vented through exhaust chamber 31 and exhaust passages 33.

In this manner, a cycle of operation is completed with the various elements returning to their starting position and the apparatus is ready to commence another cycle in response to commencement of inhalation by the user. It will be noted that pressure control valve 114 controls the peak back pressure developed in chamber 36, and flow control valve 80 controls the breathing rate.

During use of the apparatus, if nebulizer is to be effective, needle valve 133 is opened the desired amount to cause a flow of gas through feed tube 125 to the nebulizer.

What is claimed is:

1. An intermittent positive pressure breathing apparatus, comprising means providing an exhalation chamber having an inlet opening and an outlet opening and including an inhalation triggering diaphragm defining a wall portion of said chamber and an exhalation pressure diaphragm closing said outlet opening and defining another wall portion of said chamber but movable to open said outlet opening, an exhalation conduit at one end communicating with said inlet opening and at the other end adapted for communication with a user's lungs, a gas supply conduit adapted to be connected to a source of pressurized breathable gas, an inlet valve arranged in said supply conduit in a closed position but movable to an open position, an inhalation gas delivery conduit at one end communicating with said supply conduit on the downstream side of said inlet valve and at the other end adapted for communication with the user's lungs, a selectively variable flow control valve arranged in said delivery conduit, means arranged to open said inlet valve when said inhalation diaphragm moves in a direction reducing the volume of said exhalation chamber, an inhalation triggering piston disposed when driven to move said inhalation diaphragm in said direction, an exhalation pressure control piston disposed when driven to urge said exhalation diaphragm to a position closing said outlet opening, a branch conduit at one end communicating with said supply conduit downstream of said inlet valve and upstream of said flow control valve, upstream and downstream flow restrictors arranged in said branch conduit, a pressure control conduit at one end communicating with said branch conduit between said restrictors, a selectively variable pressure control valve arranged in said pressure control conduit, a service conduit at one end communicating with said branch conduit between said restrictors and at the other end servicing said inhalation piston to supply drive fluid therefor, and another service conduit at one end communicating with said branch conduit between said restrictors and at the other end servicing said exhalation piston to supply drive fluid therefor, whereby when said exhalation conduit and said delivery conduit are in communication with a user's lungs and said supply conduit is connected to a source of pressurized breathable gas the user commences a cycle of operation by inhaling on said exhalation conduit to initiate movement of said inhalation diaphragm in said direction whereupon said inlet valve is opened to drive said pistons and to pass gas to said delivery conduit until the pressure in the user's lungs rises to create a back pressure in said exhalation chamber sufficient to initiate movement of said inhalation diaphragm in a reverse direction and thereupon to move said exhalation diaphragm to open said outlet opening thereby allowing exhalation, said flow control valve controlling the breathing rate and said pressure control valve controlling the peak back pressure.

2. An intermittent positive pressure breathing apparatus, comprising a body interiorly formed to provide first and second main compartments separated by a wall having an outlet opening therein establishing communication between said main compartments and an annular seat surrounding said opening on the downwstream side thereof, an exhalation pressure diaphragm arranged in said first compartment and dividing the same into an exhaust chamber and a first ambient pressure reference chamber, said body having an exhaust passage for said exhaust chamber and a first ambient pressure reference passage for said first ambient chamber, spring means operatively interposed between said body and exhalation diaphragm urging the latter against said seat, an inhalation triggering diaphragm arranged in said second compartment and dividing the same into an exhalation chamber with which said outlet opening communicates and a second ambient pressure reference chamber, said body having an inlet opening communicating said said exhalation chamber and a second ambient pressure reference passage for said second ambient chamber, an exhalation conduit at one end communicating with said inlet opening and at the other end adapted for communication with a user's lungs, a gas supply conduit adapted to be connected to a source of pressurized breathable gas, an inlet valve arranged in said supply conduit biased to a closed position and having a stem slidably arranged on said body with one end of said stem projecting into said exhalation chamber, an inhalation gas delivery conduit at one end communicating with said supply conduit on the downstream side of said inlet valve and at the other end adapted for communication with the user's lungs, a selectively variable flow control valve arranged in said delivery conduit, a lever arranged in said exhalation chamber and operatively arranged to open said inlet valve when said inhalation diaphragm moves in a direction reducing the volume of said exhalation chamber, an inhalation triggering piston disposed when driven to move said inhalation diaphragm in said direction, an exhalation pressure control piston disposed when driven to hold said exhalation diaphragm against said seat, a branch conduit at one end communicating with said supply conduit downstream of said inlet valve and upstream of said flow control valve and at the other end communicating with said delivery conduit downstream of said flow control valve, upstream and downstream flow restrictors arranged in said branch conduit, a pressure control conduit at one end communicating with said branch conduit between said restrictors and at the other end communicating with said delivery conduit downstream of said flow control valve, a selectively variable pressure control valve arranged in said pressure control conduit, a service conduit at one end communicating with said branch conduit between said rectrictors and at the other end servicing said inhalation piston to supply drive fluid therefor, and another service conduit at one end communicating with said branch conduit between said restrictors and at the other end servicing said exhalation piston to supply drive fluid therefor, whereby when said exhalation conduit and said delivery conduit are in communication with a user's lungs and said supply conduit is connected to a source of pressurized breathable gas the user commences a cycle of operation by inhaling on said exhalation conduit to produce a differential pressure across said inhalation diaphragm initiating movement of the same in said direction whereupon said inlet valve is opened to drive said pistons and to pass gas to said delivery conduit until the pressure in the user's lungs rises to create a back pressure in said exhalation chamber sufficient to initiate movement of said inhalation diaphragm in a reverse direction and thereupon to unseat said exhalation diaphragm thereby allowing exhalation, said flow control valve controlling the breathing rate and said pressure control valve controlling the peak back pressure.

3. In intermittent positive pressure breathing apparatus, the combination comprising means providing a chamber having an inlet arranged to communicate with a user's lungs and an outlet and including an inhalation triggering diaphragm defining a wall portion of said chamber and an exhalation pressure diaphragm closing said outlet and defining another wall portion of said chamber, a supply conduit for supplying pressurized gas to be breathed, a closed but openable inlet valve arranged in said supply conduit, means biasing said inlet valve toward a closed position, means for opening said inlet valve in response to movement of said inhalation diaphragm in one direction including a lever operatively interposed between one side of said inhalation diaphragm and said inlet valve, movement of said inhalation diaphragm in said one direction being initiated by inhalation on said chamber through said inlet, an inhalation triggering piston working against the other side of said inhalation diaphragm, an exhalation pressure control piston disposed when driven to urge said exhalation diaphragm to a position closing said outlet, a branch conduit at one end communicating with said supply conduit on the downstream side of said inlet valve, upstream and downstream retrictors arranged in said branch conduit, a pressure control conduit at one end communicating with said branch conduit between said restrictors, a selectively variable pressure control valve arranged in said pressure control conduit and a service conduit servicing said inhalation piston communicating with said branch conduit between said restrictors, and another service conduit servicing said exhalation piston communicating with said branch conduit between said restrictors.

4. Apparatus according to claim 3 wherein a selectively variable flow control valve is arranged in said supply conduit downstream of said inlet valve, said one end of said branch conduit communicates with said supply conduit between said inlet valve and flow control valve, and the other end of said pressure control conduit communicates with said supply conduit downstream of said flow control valve.

5. Apparatus according to claim 4 wherein said means which bias said inlet valve toward a closed position also through said lever bias said inhalation diaphragm toward engagement with said inhalation piston, and other means bias said exhalation diaphragm toward a position closing said outlet.

References Cited

UNITED STATES PATENTS

| | | | |
|---|---|---|---|
| 2,483,698 | 10/1949 | Goodner | 128—145.8 |
| 2,870,763 | 1/1959 | Stanton | 128—145.8 |
| 2,908,270 | 10/1959 | Stanton | 128—145.8 |
| 3,138,152 | 6/1964 | Wilson | 128—145.8 |
| 3,234,932 | 2/1966 | Bird et al. | 128—145.6 |
| 3,307,542 | 3/1967 | Andreasen | 128—145.8 |
| 3,362,404 | 1/1968 | Beasley | 128—145.8 |

FOREIGN PATENTS

| | | |
|---|---|---|
| 623,226 | 7/1961 | Canada. |
| 145,147 | 5/1954 | Sweden. |

RICHARD A. GAUDET, Primary Examiner

K. L. HOWELL, Assistant Examiner

U.S. Cl. X.R.

137—102, 484.2